(12) United States Patent
Kato et al.

(10) Patent No.: US 7,310,176 B2
(45) Date of Patent: Dec. 18, 2007

(54) LIGHT DEFLECTOR USING TORSIONAL ROTATION ABOUT TWO AXES

(75) Inventors: Takahisa Kato, Atsugi (JP); Yukio Furukawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 11/349,922

(22) Filed: Feb. 9, 2006

(65) Prior Publication Data
US 2006/0198006 A1 Sep. 7, 2006

(30) Foreign Application Priority Data
Mar. 2, 2005 (JP) .............................. 2005-057491

(51) Int. Cl.
G02B 26/08 (2006.01)
(52) U.S. Cl. .................. 359/224; 359/202; 359/203
(58) Field of Classification Search ............... 359/224, 359/290, 291, 298, 202, 203
See application file for complete search history.

(56) References Cited

U.S. PATENT DOCUMENTS

| | | |
|---|---|---|
| 4,859,846 A | 8/1989 | Burrer |
| 5,047,630 A | 9/1991 | Confer et al. |
| 5,526,176 A | 6/1996 | Furukawa |
| 5,536,926 A | 7/1996 | Ikeda et al. |
| 5,543,956 A | 8/1996 | Nakagawa et al. |
| 5,629,790 A * | 5/1997 | Neukermans et al. ....... 359/198 |
| 6,044,705 A | 4/2000 | Neukermans et al. |
| 6,122,089 A * | 9/2000 | Minamoto et al. .......... 359/198 |
| 6,327,087 B1 | 12/2001 | Hashimoto et al. |
| 6,643,045 B2 * | 11/2003 | Fujita et al. ................. 359/224 |
| 6,900,925 B2 | 5/2005 | Kato et al. |
| 7,038,834 B2 | 5/2006 | Kato et al. |
| 7,039,077 B2 | 5/2006 | Furukawa et al. |
| 2004/0130766 A1* | 7/2004 | Dewa et al. ................. 359/224 |
| 2005/0128609 A1 | 6/2005 | Shimada et al. |
| 2007/0002909 A1 | 1/2007 | Furukawa et al. |

FOREIGN PATENT DOCUMENTS

| | | |
|---|---|---|
| JP | 60-107017 | 6/1985 |
| JP | 7-027989 | 1/1995 |
| JP | 2003-057586 | 2/2003 |
| JP | 2003-295102 | 10/2003 |

* cited by examiner

Primary Examiner—Stephone B. Allen
Assistant Examiner—Jennifer L. Doak
(74) Attorney, Agent, or Firm—Fitzpatrick, Cella, Harper & Scinto

(57) ABSTRACT

A light deflector for scanning with light from a light source comprises a support body, an oscillation system and a drive means for driving the oscillation system. The oscillation system includes a first movable element and a second movable element having a light deflecting body. The first movable element is resiliently supported by the support body by means of a single first torsion spring. The second movable element is resiliently supported by the first movable element by means of a plurality of second torsion springs located vis-à-vis with the second movable element interposed between them.

6 Claims, 6 Drawing Sheets

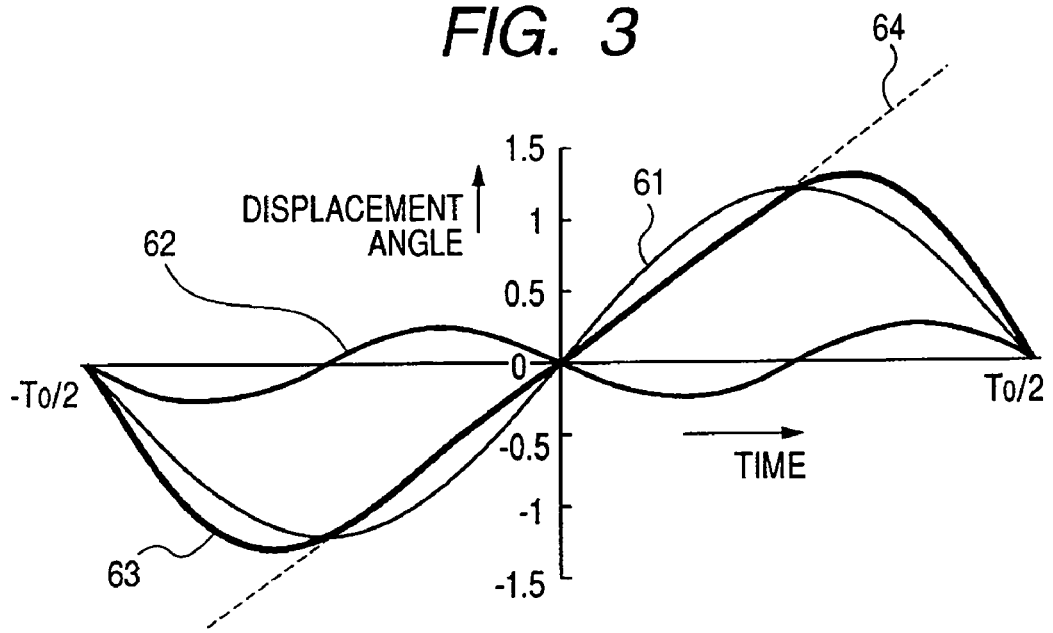
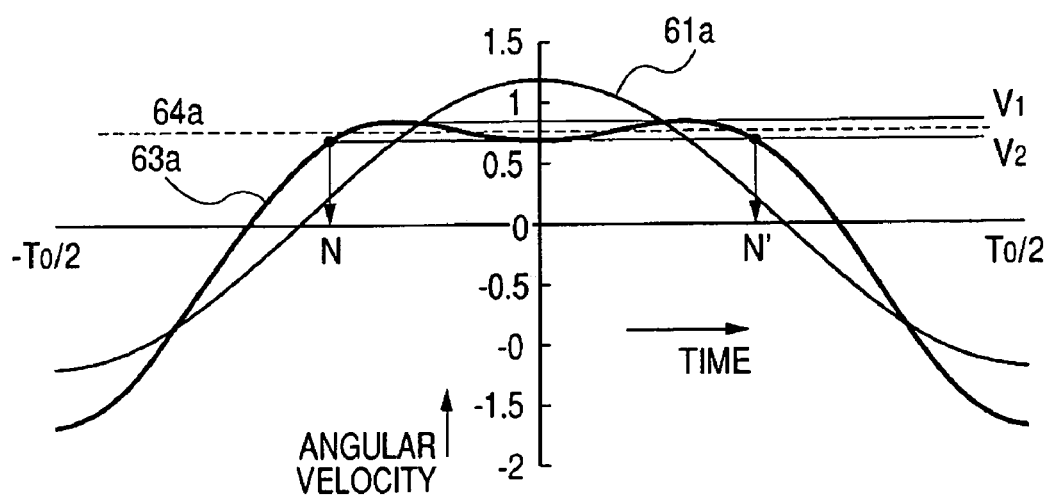

PRIOR ART

PRIOR ART

LIGHT DEFLECTOR USING TORSIONAL ROTATION ABOUT TWO AXES

BACKGROUND OF THE INVENTION

1. Field of the Invention

This invention relates to a light deflector for scanning with light from a light source and an image forming apparatus that utilizes such a light deflector. For example, the present invention can suitably be applied to an image forming apparatus such as a projection display adapted to project an image by deflecting light for scanning or a laser beam printer or a digital copier that involves an electrophotographic process.

2. Related Background Art

Various optical scanning systems (and optical scanning apparatus) that utilize a reflection surface to be subjected to sinusoidal oscillation so as to make it operate as a light deflector have been proposed to date. Optical scanning systems that utilize a reflection surface to be subjected to sinusoidal oscillation with use of a light deflector using a resonance phenomenon provide advantages. These advantages include that the light deflector of such an optical scanning system can be remarkably downsized, that they consumes little electric power and that a light deflector formed by Si single crystals that are manufactured by way of a semiconductor process is theoretically free from metal fatigue and highly durable, as compared with an optical scanning system that utilizes a rotating polygon mirror or the like.

As for light deflectors that utilize a resonance phenomenon, known optical scanning techniques for simultaneously exciting two or more than two resonance modes in different senses of rotary oscillation include the following. Firstly, there is known the use of a gimbal-type light deflector that realizes two-dimensional deflection by simultaneously exciting two resonance modes in two senses of rotary oscillation around central axes that are orthogonal relative to each other. Secondly, there is known the use of a light deflector that operates for scanning at a substantially same angular velocity like a triangular wave by simultaneously exciting two or more than resonance modes around the same central axis.

FIG. 9 of the accompanying drawings schematically illustrates a typical gimbal-type light deflector. Referring to FIG. 9, an outer movable element 4023 is connected to a support body 4025 by means of a pair of first torsion springs 4024 so as to be able to give rise to torsional oscillation that takes place around a first axis of torsion 4017. On the other hand, a movable element 4021 is connected to the outer movable element 4023 by means of a pair of second torsion springs 4022 so as to be able to give rise to torsional oscillation that takes place around a second axis of torsion 4018. A light deflector (not shown) such as a reflection surface that deflects light is arranged on the movable element 4021. Therefore, it is possible to two-dimensionally deflect light from a light source for scanning as the outer movable element 4023 and the movable element 4021 are driven to give rise to torsional oscillation respectively around the first axis of torsion 4017 and the second axis of torsion 4018 by a drive means 4016. The drive means 4016 may be formed by using permanent magnets arranged respectively at the movable element 4021 and at the outer movable element 4023 and fixed coils for driving the respective permanent magnets. This arrangement is advantageous particularly when the light deflector is driven with the frequency of natural oscillation mode around the axis of torsion that is defined by the profile and the material of the light deflector because a large displacement is produced by a small amount of energy.

A two-dimensional scanning system that is compact and simple for optical adjustments can be realized by using such a gimbal-type light deflector because a single light deflector can operate for two-dimensional deflection/scanning. U.S. Pat. No. 6,044,705 and Japanese Patent Application Laid-Open Nos. H07-27989 and 2003-295102 describe gimbal-type light deflectors of the type under consideration.

FIG. 8 of the accompanying drawings schematically illustrates a light deflector that operates for scanning at a substantially same angular velocity like a triangular wave by simultaneously exciting two resonance modes.

Referring to FIG. 8, light deflector 1012 is formed by a first movable element 1014, a second movable element 1016, a fist torsion spring 1018 for connecting them and resiliently supporting them and a second torsion spring 1020 for resiliently supporting the second movable element 1016 and a mechanical grounding surface. All these components are driven by a drive means 1023 to give rise to torsional oscillation around an axis of torsion 1026. The first movable element 1014 has a reflection surface 1015 for deflecting light so that it deflects light from a light source by torsional oscillation for scanning. The light deflector 1012 has a primary natural oscillation mode that provides a reference frequency and a secondary natural oscillation mode that provides a frequency equal to about three times of the reference frequency for torsional oscillation around the axis of torsion 1026. The drive means 1023 drives the light deflector 1012 at two frequencies, one equal to that of primary natural oscillation mode and the other that is in phase with and equal to about three times of the first one. Thus, since the light deflector 1012 gives rise to torsional oscillation simultaneously in a primary natural oscillation mode and also in a secondary natural oscillation mode, the displacement angle of light reflected by the first movable element 1014 changes not like a sinusoidal wave but like a triangular wave due to the two oscillation modes that are superposed one on the other. Therefore, the angular velocity of the deflecting/scanning operation of the light deflector shows a wide range where it remains substantially constant to give a large ratio of the usable range relative to the overall deflection/scanning range if compared with the displacement angle that changes like a sinusoidal wave.

U.S. Pat. Nos. 4,859,846 and 5,047,630 describe light deflectors of the above-described type.

SUMMARY OF THE INVENTION

The present invention proposes a light deflector for scanning with light that can maintain the flatness of the reflection surface and reduce the influence of the mount member where the light deflector is mounted on the characteristics of the light deflector (including the flatness of the reflection surface, the resonance frequency, the mechanical oscillation amplifying ratio, the liability to damage and so on).

According to the present invention, there is provided a light deflector for scanning with light from a light source, the light deflector comprising a support body, an oscillation system and a drive means for driving the oscillation system, the oscillation system including a first movable element and a second movable element having a light deflecting body, the first movable element being resiliently supported by the support body by means of a single first torsion spring so as to be able to give rise to torsional oscillation around a first axis of torsion, the second movable element being resiliently supported by means of the first movable element by a plurality of second torsion springs located vis-à-vis with the second movable element interposed between them so as to be able to give rise to torsional oscillation around a second axis of torsion Thus, according to the invention, it is possible to provide a light deflector for scanning with light that can maintain the flatness of the reflection surface and reduce the influence of the mount member where the light deflector is mounted on the characteristics of the light deflector (including the flatness of the reflection surface, the resonance frequency, the mechanical oscillation amplifying ratio, the liability to damage and so on).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention:

FIG. 3 is a schematic illustration of the displacement angle of light deflected for scanning by the first embodiment of present invention that varies as a function of time;

FIG. 4 is a schematic illustration of the angular velocity of light deflected for scanning by the first embodiment of the present invention that varies as a function of time;

DESCRIPTION OF THE PREFERRED EMBODIMENTS

Now, the present invention will be described in greater detail by referring to the accompanying drawings that illustrate preferred embodiments of the invention.

First Embodiment

Figure 1A:
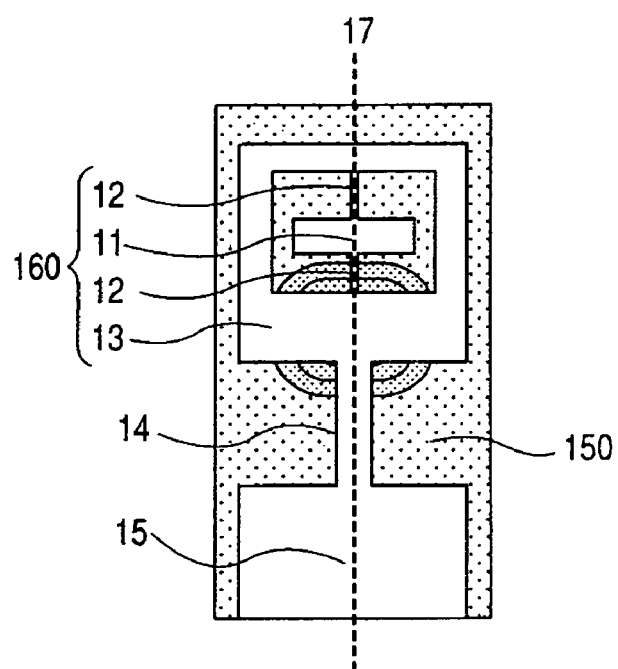
FIG. 1A is a schematic illustration of a first embodiment of light deflector according to the present invention.
Figure 1B:
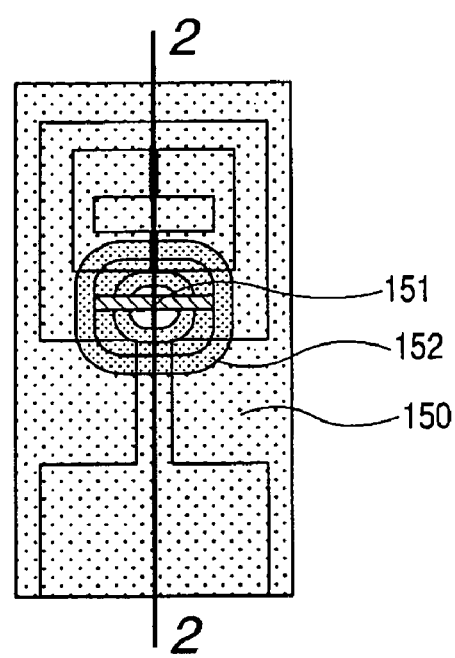
FIG. 1B is a schematic illustration of a drive means of the first embodiment of light deflector according to the present invention.

FIG. 1A and FIG. 1B are schematic illustrations of the first embodiment of light deflector according to the present invention. As shown in FIG. 1A, this embodiment of light deflector comprises a second oscillating movable, element 11, a first oscillating movable element 13, a pair of oscillation system torsion springs 12 connecting the first and second oscillating movable elements and resiliently supporting them and a support body torsion spring 14 for resiliently supporting the first oscillating movable element 13 by a support body 15 that is a mechanical grounding section. The support body 15 is rigidly secured to a mount member 150. The second oscillating movable element 11, the first oscillating movable element 13 and the oscillation system torsion springs 12 (these three elements of this embodiment are collectively referred to as oscillation system 160 hereinafter) are driven to give rise to torsional oscillation around an axis of torsion 17 by a drive means, which will be described in greater detail hereinafter. FIG. 1B illustrates the oscillation system 160 and the drive means that is located below the support body 15. The drive means is constituted by a permanent magnet 151 that is rigidly secured to the first oscillating movable element 13 and a fixed coil 152 that is rigidly secured to the mount member 150. The second oscillating movable element 11 has a reflection surface (not shown) so as to operate as a light deflecting element for deflecting light so that it deflects light from a light source for scanning by the torsional oscillation of the second oscillating movable element 11.

Figure 2:
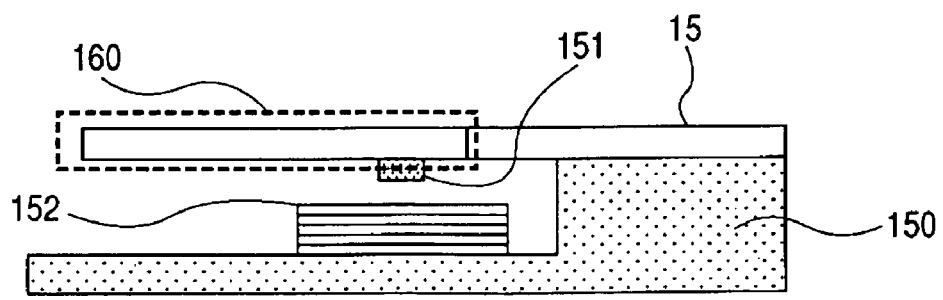
FIG. 2 is a schematic cross sectional view of the first embodiment of light deflector according to the present invention taken along line 2-2 in FIG. 1B.

In this embodiment, the second oscillating movable element 11 is supported at opposite ends thereof by the two oscillation system torsion springs 12, whereas the first oscillating movable element 13 is supported only at an end thereof by the single support body torsion spring 14. Thus, the oscillation system is supported by the support body 15 like a cantilever. FIG. 2 is a schematic cross sectional view taken along line 2-2 in FIG. 1B. As shown in FIG. 2, the support body 15 is rigidly secured to the mount member 150, which mount member 150 is appropriately holding the oscillation system 160, the permanent magnet 151 and the fixed coil 152 in position.

Now, the principle of operation of driving this embodiment of light deflector will be described below. The light deflector can be regarded as an oscillation system with two degrees of freedom in terms of torsional oscillation around the axis of torsion 17 as it has a primary natural oscillation mode of frequency $f_0$ that provides a reference frequency and a secondary natural oscillation mode that provides a frequency equal to about twice of the reference frequency. Thus, the fixed coil 152 drives the light deflector with the frequency of the primary natural oscillation mode and the frequency that is in phase with and equal to about twice of the former frequency.

FIG. 3 is a graph illustrating the displacement angle of light that appears due to the torsional, oscillation of the second oscillating movable element 11 with the frequency of $f_0$ that varies as time t is taken on the abscissa. FIG. 3 shows in particular the displacement angle that corresponds to a cycle period $T_0$ of torsional oscillation of the second oscillating movable element 11 ($-T_0/2 < X < T_0/2$).

In FIG. 3, the curve 61 indicates the component of the reference frequency $f_0$ of the drive signal for driving the fixed coil 152, which shows sinusoidal oscillation of oscillating in a reciprocating manner within a range of defined by a maximum amplitude of $\pm\Phi_1$ and expressed by formula below:

$$\theta_1 = \Phi_1 \sin[w_0 t] \qquad (1),$$

where t represents time and $w_0$ represents angular frequency and is equal to $2\pi f_0$.

On the other hand, curve 62 indicates the frequency component that is twice the reference frequency $f_0$, which shows sinusoidal oscillation of oscillating in a reciprocating manner within a range of a maximum amplitude of $\pm\Phi_2$ and expressed by formula below:

$$\theta_2 = \Phi_2 \sin[2w_0 t] \quad (2).$$

Now, curve 63 indicates the displacement angle of the torsional oscillation of the second oscillating movable element 11 that is produced as a result of the above-described driving operation. The light deflector can be regarded as an oscillation system with two degrees of freedom in terms of torsional oscillation as pointed out above and hence has a natural oscillation mode of the reference frequency $f_0$ and a secondary natural frequency mode of the frequency of $2f_0$. Therefore, the light deflector produces resonances that are excited respectively to the above-described drive signals $\theta_1$ and $\theta_2$. Thus, the displacement angle of the second oscillating movable element 11 as indicated by the curve 63 shows a saw-edge-shaped oscillation that is produced by superposing two sinusoidal oscillations and expressed by $$\theta = \theta_1 + \theta_2 = \Phi_1 \sin[w_0 t] + \Phi_2 \sin[2w_0 t] \quad (3).$$

FIG. 4 shows curves 61a and 63a and straight line 64a obtained by differentiating the curves 61 and 63 and the straight line 64 of FIG. 3 to indicate the angular velocities of the curves. As compared with the curve 61a that indicates the angular velocity of the sinusoidal oscillation of the reference frequency $f_0$, the curve 63a that indicates the angular velocity of the oscillation of the second oscillating movable element 11 that is a saw-edge-shaped oscillation of oscillating in a reciprocating manner is found within a range defined by the largest limit and the smallest limit respectively equal to the angular velocity $V_1$ at the maximum point and the angular velocity $V_2$ at the minimum point within the interval N-N'. Thus, when a light deflector of the type under consideration utilizes deflection of light for scanning in an application, the interval N-N' can be regarded substantially as that of uniform angular velocity scanning if $V_1$ and $V_2$ are found within the limits of tolerable error as viewed from the straight line 64a that indicates uniform angular velocity scanning. Therefore, the angular velocity, of the oscillation of the deflecting/scanning operation of a light deflector shows a wide range where it remains substantially constant when the oscillation is a saw-edge-shaped oscillation of oscillating in a reciprocating manner if compared with the displacement angle of oscillation that changes like a sinusoidal wave. Thus, it is possible to produce a large ratio of the usable range relative to the overall deflection/scanning range.

Now, generally, the reflection surface of a light deflector is desired to constantly hold an enhanced level of flatness during a light deflecting operation. Therefore, it is necessary to suppress the deformation, if any, of the reflection surface regardless of whether the light deflector is being brought to a halt or being driven for operation. Additionally, in a light deflector whose drive frequency is found near its resonance frequency, as in the case of this embodiment, the resonance frequency can vary depending on the ambient temperature and other environmental conditions. The possible reasons for the change in the resonance frequency include the stress and the deflection caused by the mount member 150 where the support body 15 is arranged as well as the change in the Young's modulus and the thermal expansion of any of the related members due to the temperature thereof. The stress and the deflection caused by the mount member 150 can by turn give rise to a change in the mechanical oscillation amplifying ratio and a sort of deformation of the reflection surface due to the static balance of stress as well as the change in the resonance frequency. Particularly, for a light deflector where two or more than two resonance modes are simultaneously excited so as to deflect light with a waveform produced by superposing a plurality of sinusoidal oscillations as in the case of this embodiment, it is very important to keep the mutual relationship of the resonance modes that are employed for driving the deflector (the mechanical oscillation amplifying ratio, the amplitude ratio, the phase difference and so on) unchanged. However, the relationship can be affected by the stress and the deflection applied by the mount member 150, which are therefore needed to be reduced.

In this embodiment, the second oscillating movable element 11 is supported at opposite ends thereof by two oscillation system torsion springs 12, whereas the first oscillating movable element 13 is supported only at an end thereof by a single support body torsion spring 14. The torsion springs that characterize the support structure of this embodiment provide the following advantages.

As the second oscillating movable element 11 is supported at opposite ends thereof by two oscillation system torsion springs 12, it is possible to effectively suppress the deformation, if any, that can be produced by the angular acceleration that arises when torsional oscillation takes place.

When stress and deflection are applied to the support body 15 by the mount member 150 due to temperature, moisture and/or an external impact, the application of stress to the oscillation system can be minimized as the first oscillating movable element 13 is supported only at an end thereof by the support body 15 like a cantilever. Therefore, the mutual relationship of the resonance modes that are employed for driving the deflector (the mechanical oscillation amplifying ratio, the amplitude ratio, the phase difference and so on) is advantageously kept unchanged in this embodiment because the deformation of the first movable element due to the angular acceleration when it is driven to operate and/or due to the stress and the deflection applied by the mount member is reduced and, at the same time, the change in the resonance frequency and the oscillation amplifying ratio is minimized. Additionally, because stress and deflection are prevented from being applied to it by the mount member, the oscillation system is hardly damaged by the stress that is otherwise applied by the mount member.

Second Embodiment

Figure 5:
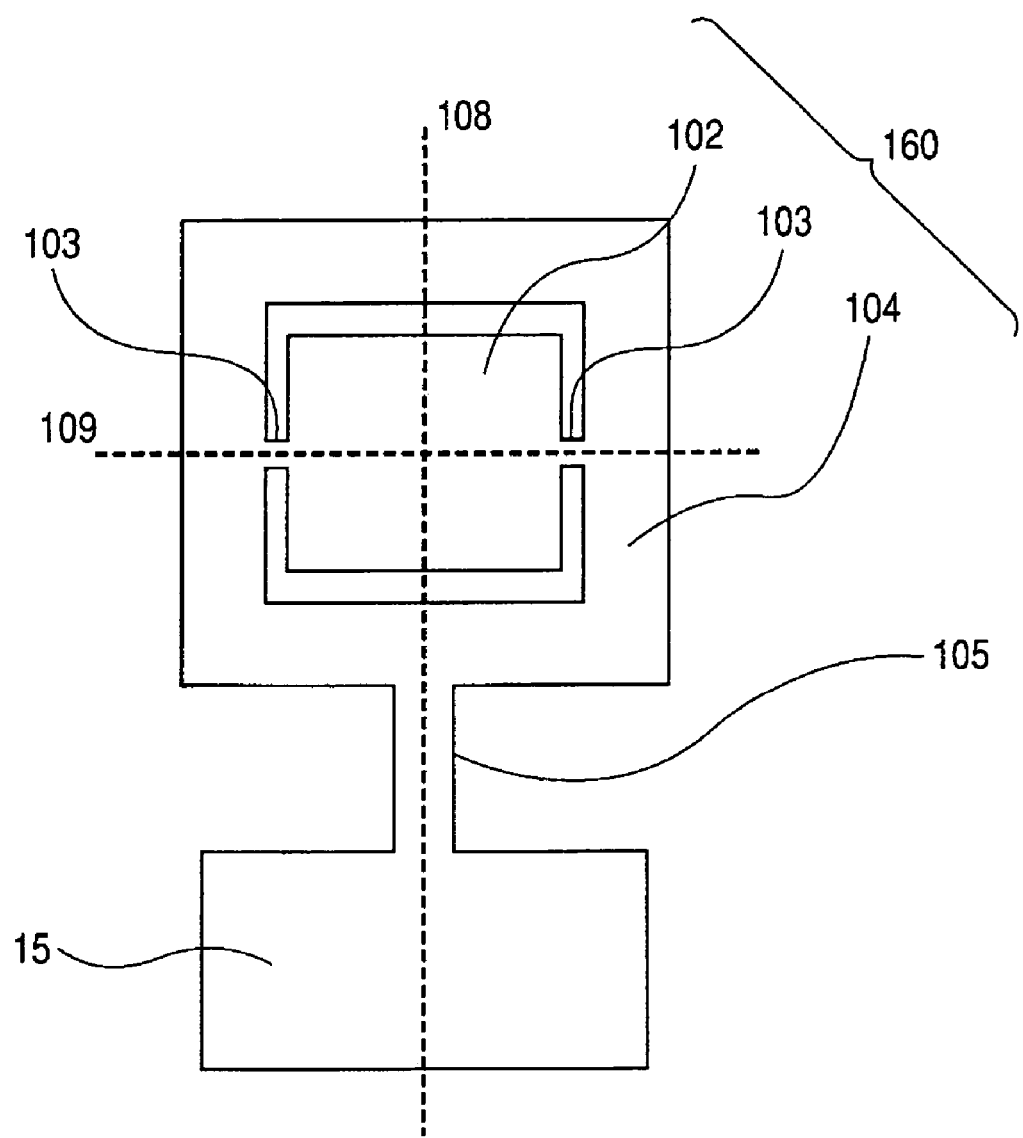
FIG. 5 is a schematic illustration of a second embodiment of light deflector according to the present invention.

FIG. 5 is a schematic illustration of the second embodiment of light deflector according to the present invention. In FIG. 5, the components that are the same as or similar to their counterparts of the first embodiment illustrated in FIGS. 1A and 1B in terms of function are denoted respectively by the same reference symbols. Referring to FIG. 5, the light deflector of this embodiment comprises two movable elements including a first oscillating movable element 104 and a second oscillating movable element 102 that are supported resiliently and respectively around an axis of torsion 108 of a support body and an axis of torsion 109 of an oscillation system so as to be able to freely give rise to torsional oscillation.

The support body 15 that provides a mechanical grounding surface and the first oscillating movable element 104 are connected to each other by a single first axis torsion spring 105 so as to be able to give rise to torsional oscillation that takes place around the axis of torsion 108 of the support body. On the other hand, as shown in FIG. 5, the second oscillating movable element 102 is located inside the first oscillating movable element 104 and connected to the first oscillating movable element 104 by means of two torsion springs 103 so as freely to give rise to torsional oscillation around the axis of torsion 109 of the oscillation system. The second oscillating movable element 102 has on the surface thereof a reflection surface (not shown) that operates as light deflecting body so that it can reflect and deflect incident light. The three elements of this embodiment including the first oscillating movable element 104, the second oscillating movable element 102 and the torsion springs 103 are collectively referred to as oscillation system 160 hereinafter.

Additionally, since the axis of torsion 108 of the support body and the axis of torsion 109 of the oscillation system are substantially orthogonal relative to each other, the second oscillating movable element 102 gives rise to torsional displacement around the axis of torsion 109 of the oscillation system and, at the same time, is adapted to be displaced around the axis of torsion 108 of the support body for the first oscillating movable element 104. Thus, the second oscillating movable element 102 can be displaced around those two axes. Then, light striking the reflection surface of the second oscillating movable element 102 is deflected for two-dimensional scanning.

Like the support body 15 of the first embodiment illustrated in FIG. 2, the support body 15 is arranged on a mount member 150 (not shown) in the second embodiment. Thus, light from the light source is deflected for two-dimensional scanning as the first oscillating movable element 104 and the second oscillating movable element 102 are driven by a drive means (not shown) to give rise to torsional oscillation respectively around the axis of torsion 108 of the support body and the axis of torsion 109 of the oscillation system. The drive means is formed by a permanent magnet rigidly secured to the first oscillating movable element 104 and a fixed coil arranged on the mount member 150 as in the case of the first embodiment illustrated in FIG. 2.

In this embodiment, the oscillation system 160 that is similar to the oscillation system 160 of the first embodiment is supported by the support body 15 like a cantilever. Thus, the second oscillating movable element 102 is supported at opposite ends thereof by the two torsion springs 103, whereas the first oscillating movable element 104 is supported only at an end thereof by the single support body torsion spring 105. Therefore, the mutual relationship of the resonance modes that are employed for driving the deflector (the mechanical oscillation amplifying ratio, the amplitude ratio, the phase difference and so on) and take place around the two axes of torsion 108 and 109 that are orthogonal relative to each other is advantageously kept unchanged also in this embodiment. This is because the deformation of the second movable element 102 due to the angular acceleration when it is driven to operate and/or due to the stress and the deflection applied by the mount member 150 is reduced and, at the same time, the change in the resonance frequency and the oscillation amplifying ratio is minimized. Additionally, because stress and deflection are prevented from being applied to it by the mount member, the oscillation system is hardly damaged by the stress that is otherwise applied by the mount member.

Third Embodiment

Figure 6:
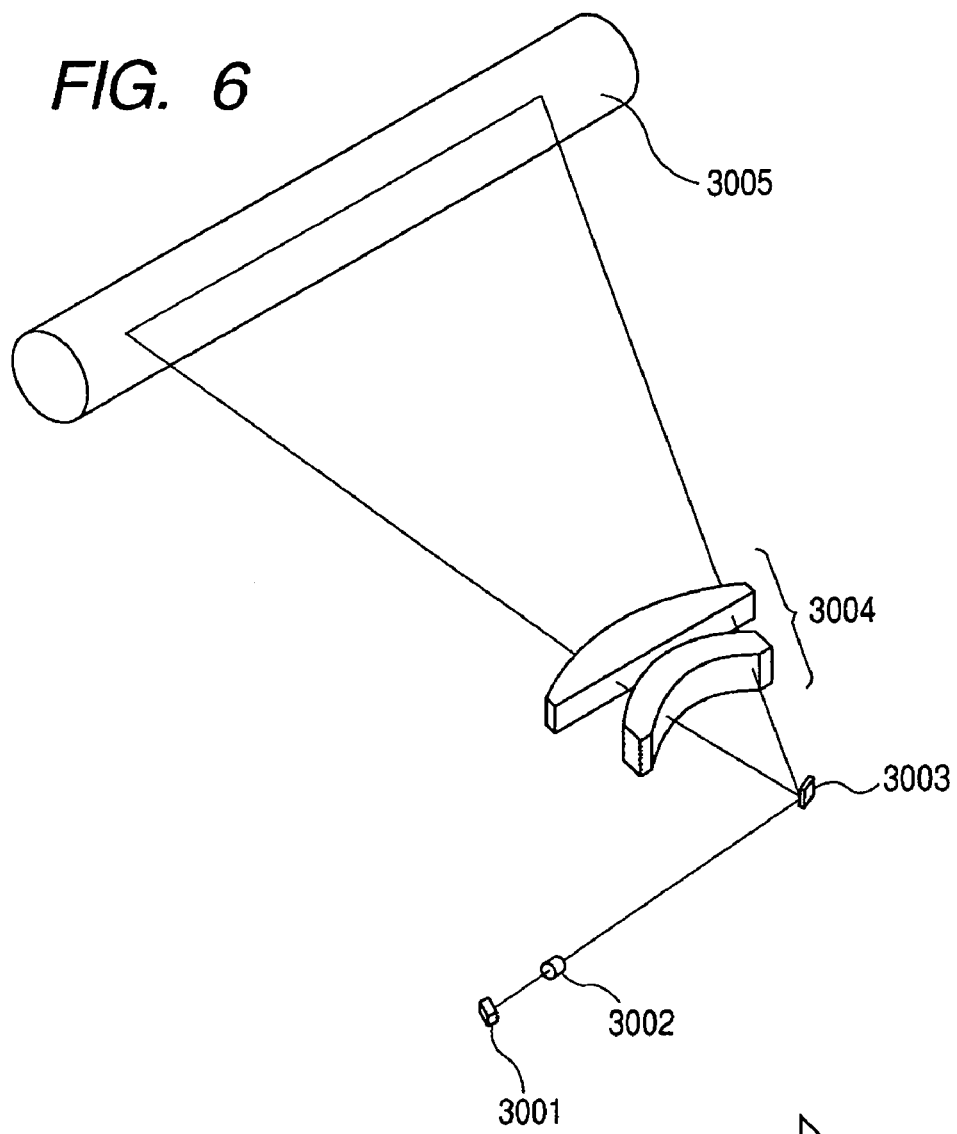
FIG. 6 is a schematic illustration of an embodiment of optical appliance realized by using a light deflector according to the present invention.

FIG. 6 is a schematic illustration of an embodiment of optical appliance realized by using the above-described optical scanning system. The optical appliance is an image forming apparatus. Referring to FIG. 6, numeral 3003 denotes the first embodiment of light deflector according to the invention that is adapted to operate for scanning with incident light one-dimensionally. In FIG. 6, numeral 3001 denotes a laser beam source and numeral 3002 denotes a lens or a lens group, whereas numeral 3004 denotes a write lens or lens group and numeral 3005 denotes a photosensitive body. The laser beam emitted from the laser beam source 3001 is modulated for the intensity of light in a predetermined manner, which is related to the timing of deflecting light for one-dimensional scanning, by way of the optical scanning system 3003. The laser beam for one-dimensional scanning then forms an image on the photosensitive body 3005 by means of the write lens 3004. The photosensitive body 3005 is uniformly charged with electricity by means of an electric charger (not shown) and an electrostatic latent image is formed on the surface thereof as it is scanned by the laser beam. Thereafter, a toner image is produced on the image part of the electrostatic latent image by a developing unit (not shown) and a corresponding ordinary image is formed on a sheet of paper (not shown) as the toner image is transferred onto the sheet of paper and fixed. With the light deflector according to the present invention, it is possible to hold the angular velocity of the laser beam that is deflected for scanning to a substantially uniform level within a specified range. Additionally, it is possible to form an image on a stable basis by means of a light deflector according to the present invention regardless of external factors including the ambient temperature.

Fourth Embodiment

Figure 7:
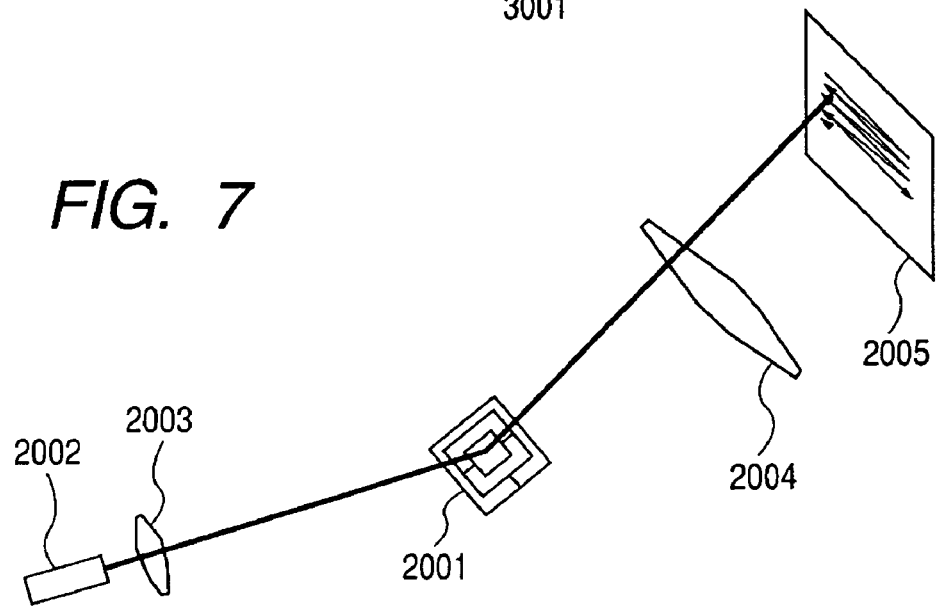
FIG. 7 is a schematic illustration of another embodiment of optical appliance realized by using a light deflector according to the present invention.
Figure 8:
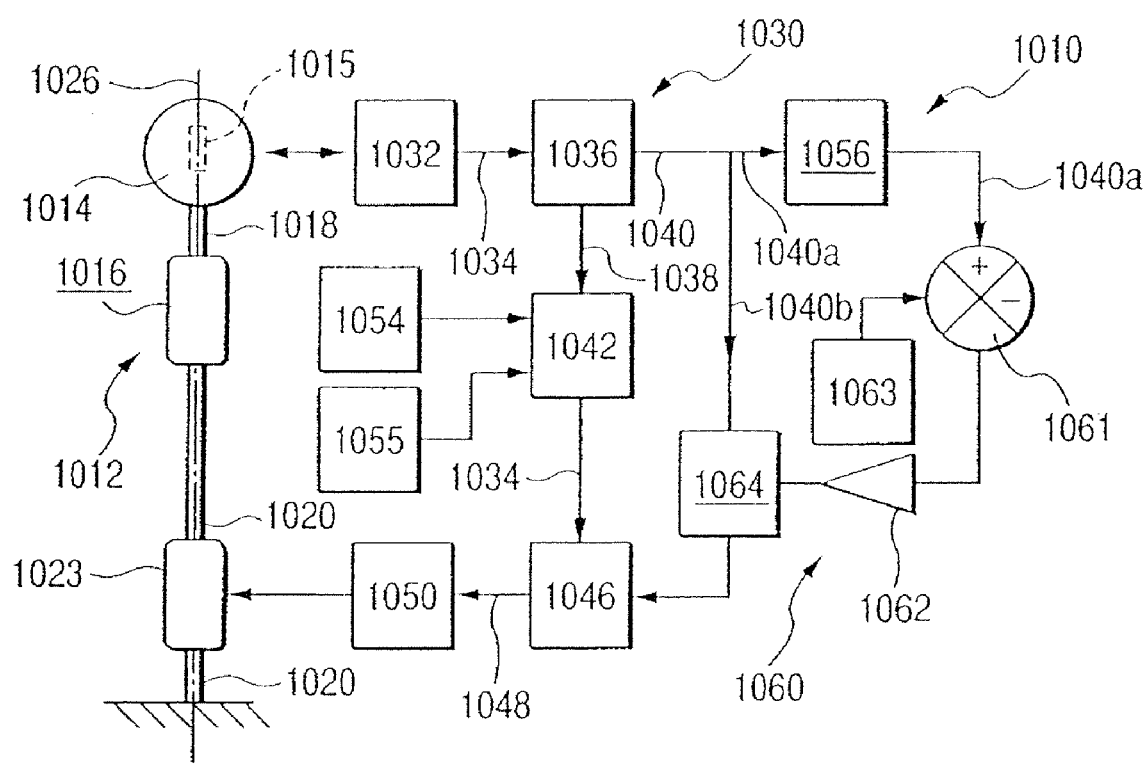
FIG. 8 is a schematic illustration of a prior art light deflector.
Figure 9:
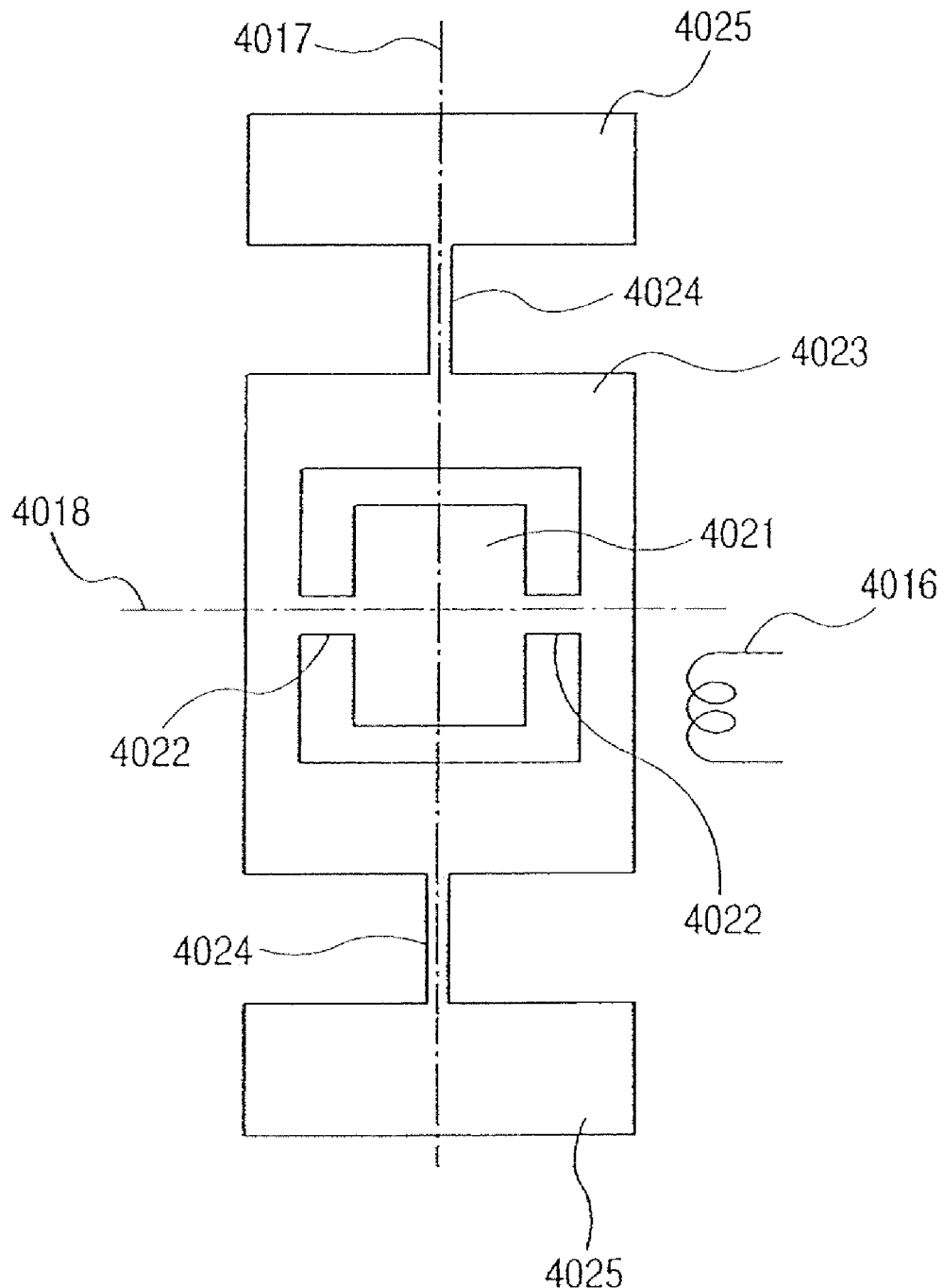
FIG. 9 is a schematic illustration of another prior art light deflector.

FIG. 7 is a schematic illustration of another embodiment of optical appliance realized by using the above-described light deflector according to the present invention. The optical appliance is an image display apparatus. Referring to FIG. 7, numeral 2001 denotes the second embodiment of light deflector according to the invention that is adapted to deflect incident light for raster-scanning a projection surface 2005. In FIG. 7, numeral 2002 denotes a laser beam source and numeral 2003 denotes a lens or a lens group, whereas numeral 2004 denotes a write lens or lens group and numeral 2005 denotes a projection surface. The laser beam emitted from the laser beam source is modulated for the intensity of light in a predetermined manner, which is related to the timing of optical scanning for two-dimensional scanning, by way of the light deflector 2001. The laser beam for scanning then forms an image on the projection surface 2005 by means of the write lens 2004.

With a light deflector according to the invention, it is possible to deflect light for raster scanning with substantially uniform angular velocity although the light deflector is compact and power-saving. Particularly, it is possible to form an image on a stable basis by means of a light deflector according to the present invention regardless of external factors including the ambient temperature.

As many apparently widely different embodiments of the present invention can be made without departing from the spirit and scope of thereof, it is to be understood that the invention is not limited to the specific embodiments thereof except as defined in the claims.

This application claims priority from Japanese Patent Application No. 2005-057491 filed on Mar. 2, 2005, which is hereby incorporated by reference herein.

What is claimed is:

1. A light deflector for scanning light from a light source, comprising:

the light deflector comprising a support body, an oscillation system and drive means for driving the oscillation system, the oscillation system comprising a first movable element and a second movable element having a light deflecting body, the first movable element being supported by the support body by means of a single first torsion spring so as to be able to give rise to torsional oscillation around a first axis of torsion, and the second movable element being supported by the first movable element by means of a plurality of second torsion springs located opposite each other with the second movable element interposed between them so as to be able to give rise to torsional oscillation around a second axis of torsion, wherein the first axis of torsion and the second axis of torsion are arranged substantially in parallel with each other or on a same straight line, the first movable element is connected in series with the second movable element along the first axis of torsion, the oscillation system has at least two natural oscillation modes of different frequencies around the second axis of torsion and the first axis of torsion, and the drive means drives the oscillation system so as to give rise to torsional oscillation in the at least two natural oscillation modes.

2. The light deflector according to claim 1, wherein the oscillation system has two natural oscillation modes of different frequencies and one of the frequencies is about twice as high as the other frequency.

3. The light deflector according to claim 1, wherein the oscillation system has two natural oscillation modes of different frequencies and one of the frequencies is about three times as high as the other frequency.

4. An image forming apparatus comprising:

a light source;

a light deflector; for scanning light from a light source, said light deflector comprising:

the light deflector comprising a support body, an oscillation system and drive means for driving the oscillation system, the oscillation system comprising a first movable element and a second movable element having a light deflecting body, the first movable element being supported by the support body by means of a single first torsion spring so as to be able to give rise to torsional oscillation around a first axis of torsion, and the second movable element being supported by the first movable element by means of a plurality of second torsion springs located opposite each other with the second movable element interposed between them so as to be able to give rise to torsional oscillation around a second axis of torsion; and a photosensitive body, wherein the light deflector is adapted to deflect light from the light source so as to project light from the light source on the photosensitive body, the first axis of torsion and the second axis of torsion are arranged substantially in parallel with each other or on a same straight line, the first movable element is connected in series with the second movable element along the first axis of torsion, the oscillation system has at least two natural oscillation modes of different frequencies around the second axis of torsion and the first axis of torsion, and the drive means drives the oscillation system so as to give rise to torsional oscillation in the at least two natural oscillation modes.

5. An image display apparatus comprising:

a light source; and a light deflector, for scanning light from a light source, said light deflector comprising:

the light deflector comprising a support body, an oscillation system and drive means for driving the oscillation system, the oscillation system comprising a fist movable element and a second movable element having a light deflecting body, the first movable element being supported by the support body by means of a single first torsion spring so as to be able to give rise to torsional oscillation around a first axis of torsion, and the second movable element being supported by the first movable element by means of a plurality of second torsion springs located opposite each other with the second movable element interposed between them so as to be able to give rise to torsional oscillation around a second axis of torsion, wherein the light deflector is adapted to deflect light from the light source so as to project light from the light source on an image displaying body, the first axis of torsion and the second axis of torsion are arranged substantially in parallel with each other or on a same straight line, the first movable element is connected in series with the second movable element along the first axis of torsion, the oscillation system has at least two natural oscillation modes of different frequencies around the second axis of torsion and the first axis of torsion, and the drive means drives the oscillation system so as to give rise to torsional oscillation in the at least two natural oscillation modes.

6. A light deflector for scanning light from a light source, comprising:

the light deflector comprising a support body, an oscillation system and a driver for driving the oscillation system, the oscillation system comprising a first movable element and a second movable element having a light deflecting body, the first movable element being supported by the support body by means of a single first torsion spring so as to be able to give rise to torsional oscillation around an axis of torsion, and the second movable element being supported by the first movable element by means of a plurality of second torsion springs located opposite each other with the second movable element interposed between them so as to be able to give rise to torsional oscillation around the axis of torsion, wherein the oscillation system has at least two natural oscillation modes of different frequencies around the axis of torsion, and the driver drives the oscillation system so as to give rise to torsional oscillation in the at least two natural oscillation modes.

* * * * *

UNITED STATES PATENT AND TRADEMARK OFFICE
CERTIFICATE OF CORRECTION

PATENT NO.        : 7,310,176 B2
APPLICATION NO.   : 11/349922
DATED             : December 18, 2007
INVENTOR(S)       : Takahisa Kato et al.

It is certified that error appears in the above-identified patent and that said Letters Patent is hereby corrected as shown below:

COLUMN 1:
Line 25, "consumes" should read --consume--;
Line 42, "than" should be deleted.

COLUMN 2:
Line 28, "of" should be deleted;
Line 33, "of" should be deleted.

COLUMN 3:
Line 31, "cross sectional" should read --cross-sectional--.

COLUMN 4:
Line 29, "cross sectional" should read --cross-sectional--;
Line 43, "of" should be deleted;
Line 46, "of" should be deleted;
Line 58, "of" should be deleted.

COLUMN 8:
Line 7, "intensityof" should read --intensity of--; and "apredetermined" should read --a predetermined--.

Signed and Sealed this

Fourteenth Day of April, 2009

JOHN DOLL
*Acting Director of the United States Patent and Trademark Office*